(12) United States Patent
Huang

(10) Patent No.: US 6,517,202 B2
(45) Date of Patent: Feb. 11, 2003

(54) EYEGLASSES WITH LENSES RAPIDLY CHANGEABLE

(76) Inventor: Jih-Hsing Huang, P.O. Box 90, Tainan City (TW)

( * ) Notice: Subject to any disclaimer, the term of this patent is extended or adjusted under 35 U.S.C. 154(b) by 0 days.

(21) Appl. No.: 09/899,158

(22) Filed: Jul. 6, 2001

(65) Prior Publication Data

US 2003/0007120 A1 Jan. 9, 2003

(51) Int. Cl.[7] .................................................. G02C 1/04
(52) U.S. Cl. ...................... 351/103; 351/106; 351/108
(58) Field of Search ................................. 351/103–109

(56) References Cited

U.S. PATENT DOCUMENTS 5,467,148 A * 11/1995 Conway ....................... 351/85
6,196,681 B1 * 3/2001 Canavan ..................... 351/106

* cited by examiner

Primary Examiner—Huy Mai

(57) ABSTRACT

Eyeglasses with lenses rapidly changeable includes a frame pivoted with two temples at both sides, and two lenses fitted in its lower portion. The frame formed as a rectangular body includes two nosepieces in its central portion and each having a supporting edge; two grooves at its left and right sides for fitting the lenses; a through recess and a through hole at both sides of each of the grooves; and a stop edge and a stop rod below the through recess and through hole. Each of the lenses has two engagement portions formed outwardly and at both ends of the lens for being fitted into both ends of the groove, two notches below the engagement portions for being engaged with the stop edge and the stop rod, and a central edge rested against the supporting edge of the nosepiece, by which the eyeglasses with lenses rapidly changeable is structured.

1 Claim, 3 Drawing Sheets

EYEGLASSES WITH LENSES RAPIDLY CHANGEABLE

BACKGROUND OF THE INVENTION

1. Field of the Invention

This invention relates to a pair of eyeglasses with lenses rapidly changeable, particularly to one provided with a frame and two lenses, wherein the frame formed as a rectangular body and including two grooves respectively formed in the inner walls of the left and right sides of the frame, two nosepieces disposed in a central portion of the frame and each having a supporting edge, and a stop edge and a stop rod respectively disposed below both sides of each of the two grooves; the two lenses each having an upper edge and two engagement portions disposed at both ends of each of the two lenses for being fitted into each of the two grooves of the frame, two notches respectively disposed at both ends of each of the two lenses for being correspondingly engaged with the stop edge and the stop rod of each of the two grooves of the frame, and a central edge rested against each of the two supporting edges of the two nosepieces, by which the pair of eyeglasses is capable of being assembled together or replaced with new lenses rapidly.

2. Description of the Prior Art

A pair of known conventional eyeglasses includes a frame having two openings respectively provided in both outer ends of the frame and two fix bases respectively provided at two opposite sides of each of the two openings, by which screws are used to tightly screw every two opposite fix bases to keep the two lenses stably in the two openings.

The pair of known conventional eyeglasses has the following disadvantages:

1. If lenses are needed to be taken off the frame or to be replaced with new ones, a tool has to be used to loosen or fasten the screws to let the lenses to be taken off or fitted into the frame, which is very troublesome and time-consuming. Moreover, It is not easy for inexperienced users to take the lenses off the frame or fit the lenses into the frame at any time.

2. Such kind of eyeglasses is inconvenient for users to change different lenses with different colors and styles to meet with their requirements in different weathers or situations at any time.

3. The screws used in such kind of eyeglasses may easily become loose and make the lenses separated from the frame and damaged.

Another pair of known conventional eyeglasses made of plastic has lenses firmly fitted in an integral frame by heating the lenses in advance. Such kind of eyeglasses is also inconvenient for users to replace with new lenses or change different lenses with different colors and styles to meet with their requirements in different weathers or situations at any time.

SUMMARY OF THE INVENTION

The main purpose of the invention is to offer a pair of eyeglasses permitting a user to easily replace with new lenses by himself at any time.

The main feature of the invention is to provide a frame formed as a rectangular body and including two grooves respectively formed in inner walls of left and right sides of the frame, two nosepieces respectively disposed in a central portion of the frame and each having a supporting edge, two stop rods formed inwardly and respectively disposed at bottom edges of both outer ends of the frame; two lenses each having an upper edge for being fitted into each of the two grooves of the frame, two engagement portions formed outwardly and respectively disposed at both ends of the upper edge of each of the two lenses for being correspondingly fitted into both ends of each of the two grooves of the frame, two notches each disposed below each of the two engagement portions for being correspondingly engaged with each of the two stop rods of the frame, and a central edge rested against the supporting edge of each of the two nosepieces;

whereby the pair of eyeglasses with lenses rapidly and conveniently changeable is structured.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
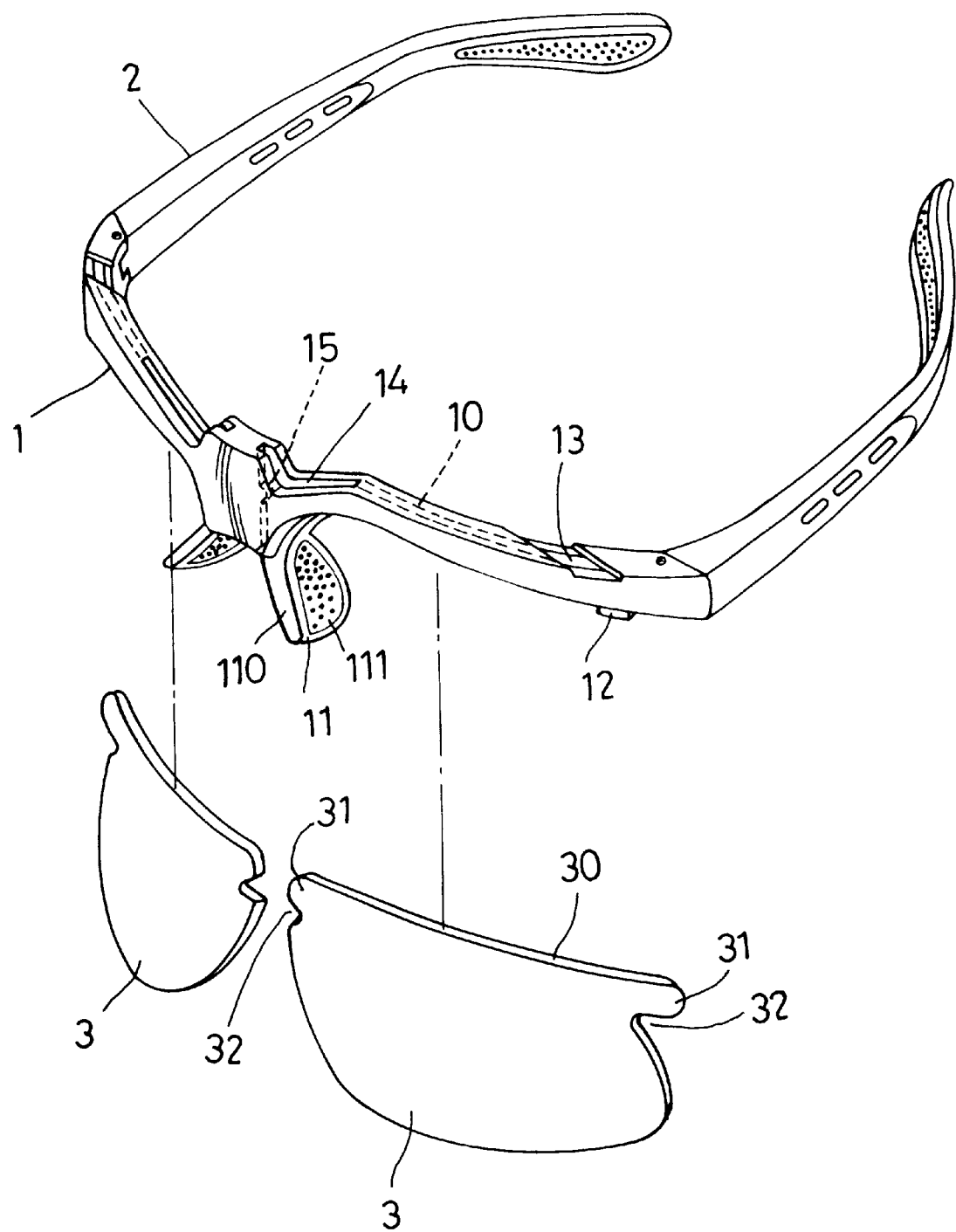
FIG. 1 is an exploded perspective view of a pair of eyeglasses with lenses rapidly changeable in the present invention.
Figure 2:
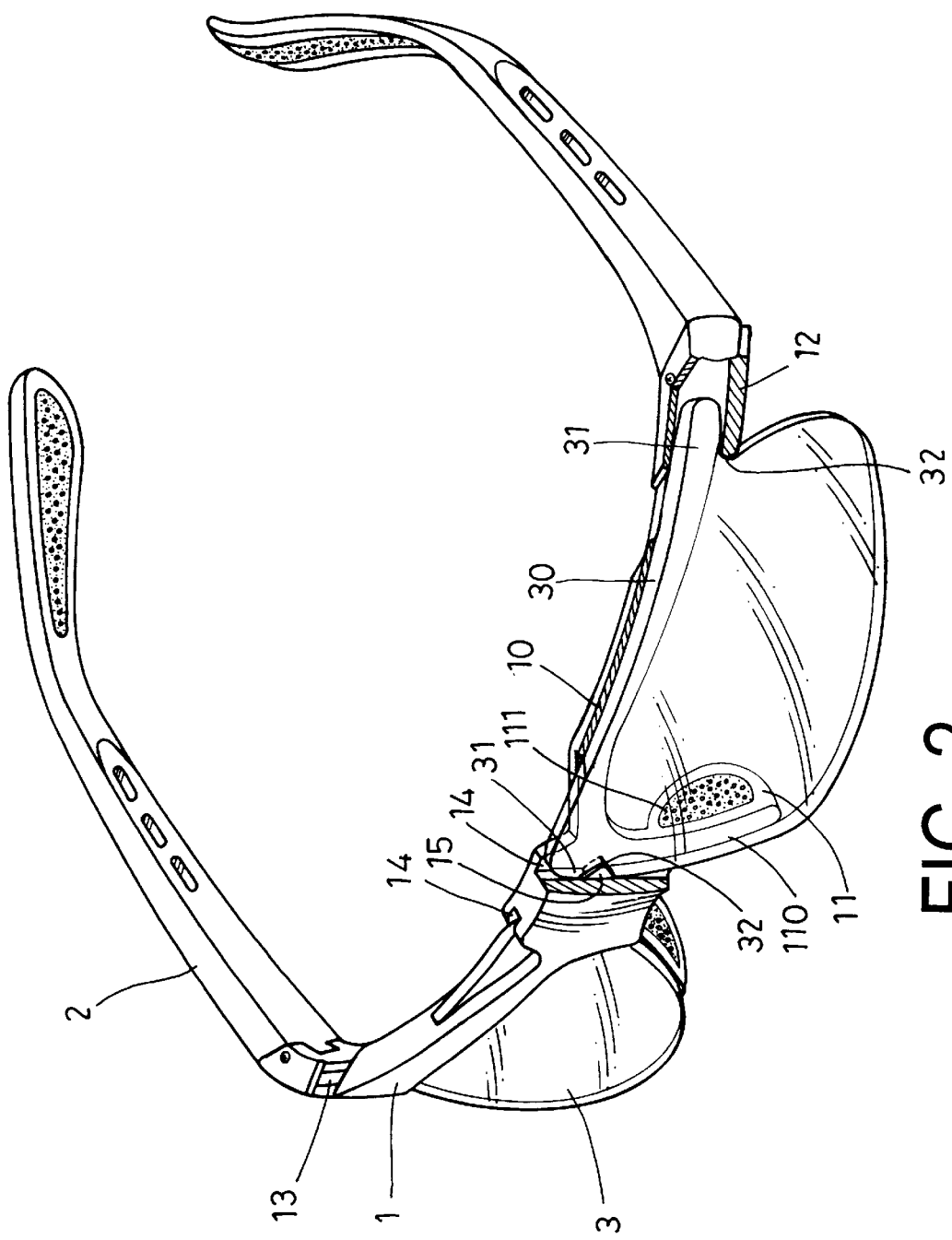
FIG. 2 is a perspective view of showing an assemblage of a frame and lenses of the pair of eyeglasses with lenses rapidly changeable in the present invention.

A preferred embodiment of the pair of eyeglasses with lenses rapidly changeable in the present invention, as shown in FIGS. 1 and 2, relates to a pair of eyeglasses including a frame 1 pivoted with two temples 2 at both sides, and two lenses 3 fitted in a lower portion of the frame 1.

Figure 3:
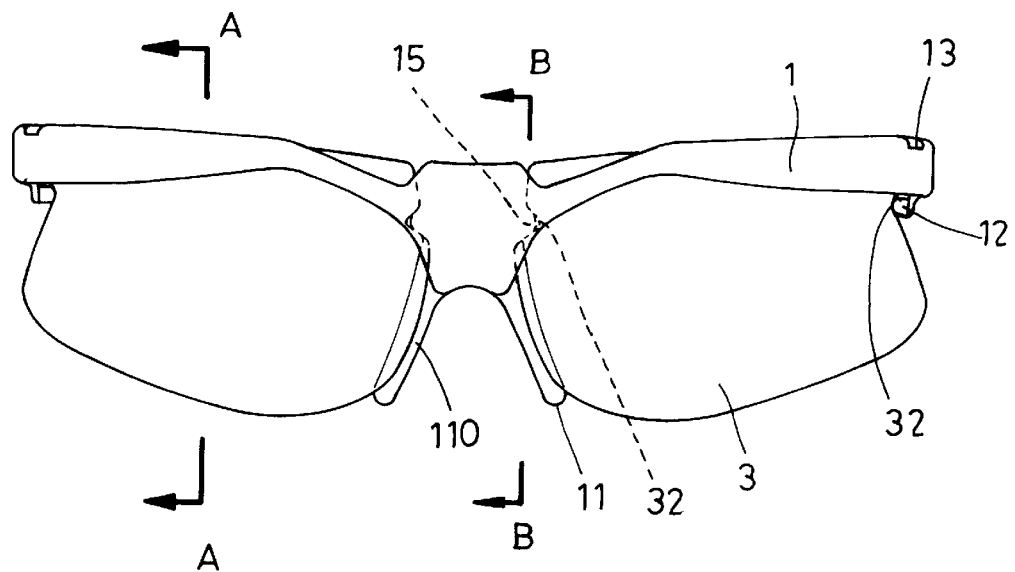
FIG. 3 is a front view of the pair of eyeglasses with lenses rapidly changeable in the present invention.

The frame 1 formed as a rectangular body and includes two grooves 10 respectively formed in inner walls of left and right sides of the frame 1, two nosepieces 11 respectively downwardly extending from a central portion of the frame 1 toward its both sides, each of the two nosepieces 11 having a supporting edge 110 in its front surface and a soft pad 111 in its inner portion, two stop rods 12 formed inwardly and respectively disposed at bottom edges of both outer ends of the frame 1, two through holes 13 respectively disposed at upper portions of both outer ends of the two groove 10 of said frame 1 corresponding to the two stop rods 12 and penetrated through inner walls of the two grooves 10, two through recesses 14 respectively formed inside two symmetrical notches having a shape similar to a symbol of square root and disposed at inner sides of the two grooves 10 close to a central portion of the frame 1, and two stop edges 15 formed outwardly and respectively disposed at inner walls of the two through recesses 14 close to upper portions of the two nosepieces 11, as shown in FIGS. 1, 2 and 3.

Each of the two lenses 3 has an upper edge 30 for being correspondingly fitted into each of the two grooves 10 in the left and right sides of the frame 1, two engagement portions 31 formed outwardly and respectively disposed at both ends of the upper edge 30 of each of the two lenses 3 for being correspondingly fitted into both ends of each of the two grooves 10 of the frame 1, two notches 32 formed inwardly and disposed below the two engagement portions 31 for being correspondingly engaged with each of the two stop rods 12 and each of the two stop edges 15 of the frame 1.

Figures 4, 5:
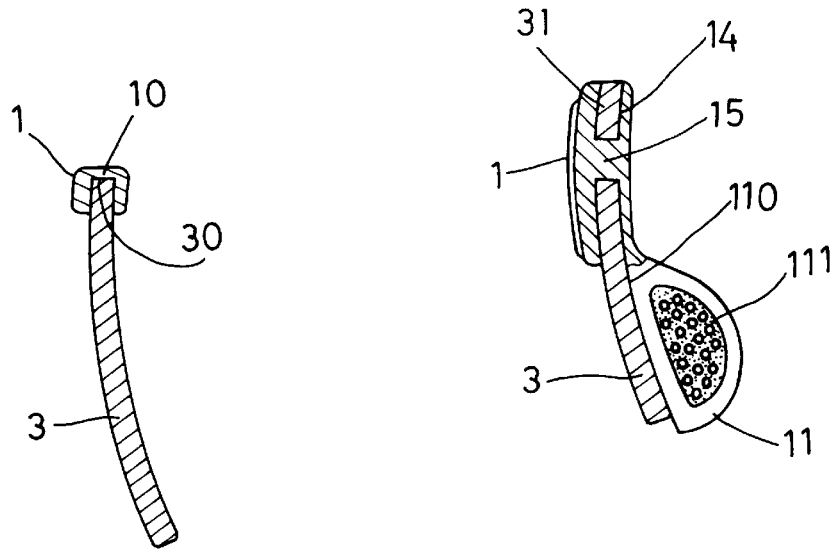
FIG. 4 is a cross-sectional view taken along section line A—A of the FIG. 3; and, FIG. 5 is a cross-sectional view taken along section line B—B of the FIG. 3.

In assembling, referring to FIGS. 1 to 5, firstly fit each of two engagement portions 31 disposed at an outer end of the upper edge 30 of each of the two lenses 3 correspondingly into an outer end of each of the two grooves 10 of the frame 1 and allow each of the two notches 32 disposed at an outer side of the same lens 3 to be engaged with each of the two stop rods 12 disposed at an outer side of the frame 1, as shown in FIGS. 2 and 3. Secondly, fit the upper edge 30 of the same lens 3 into the same groove 10 of the frame 1, as shown in FIG. 4. Thirdly, protrude the other engagement portion 31 disposed at an inner end of the upper edge 30 of the same lens 3 correspondingly out of each of the two through recess 14 disposed at an inner side of the same groove 10 close to a central portion of the frame 1 and allow the outer end of the other engagement portion 31 to be protruded out of the same through recess 14 of the frame 1 to form a unique and new visual feeling, as shown in FIGS. 2, 3 and 5. Fourthly, engage each of the two stop edges 15 disposed at an inner wall of the same groove 10 of the frame 1 into the other notch 32 disposed at an inner side of the same lens 3, by which the lens 3 is completely fitted into each of the two grooves 10 of the frame 1. With the same steps, the other lens 3 is also capable of being fitted into the other groove 10 of the frame 1 rapidly and firmly.

The invention has the following advantages, as can be understood from the aforesaid description.

1. The lenses 3 are capable of being fitted into or taken off the frame 1 with fastness and convenience.

2. A user himself can easily and rapidly change the lenses 3 at any time without need of any tools.

While the preferred embodiment of the invention has been described above, it will be recognized and understood that various modifications may be made therein and the appended claims are intended to cover all such modifications that may fall within the spirit and scope of the invention.

What is claimed is:

1. Eyeglasses with lenses capable of being changed rapidly comprising a frame pivoted with two temples at both sides of said frame and two lenses fitted in a lower portion of said frame, characterized in that:

said frame is formed as a rectangular body and includes two grooves respectively formed in interiors of left and right sides of said frame; each groove has an opening facing downwards, two nosepieces are respectively disposed in a central portion of said frame and each has a supporting edge, two stop rods formed inwardly and respectively disposed at bottom edges of both outer ends of said frame; each of said two lenses has an upper edge for being fitted into each said groove of said frame, two engagement portions formed outwardly and respectively disposed at both ends of said upper edge of each of said lenses for being correspondingly fitted into both ends of each groove of said frame, two notches each disposed below each said engagement portion for being correspondingly engaged by each said stop rod of said frame, and a lateral edge rested against each said supporting edge of each said nosepiece;

a through recess and a through hole are respectively disposed at both sides of each said groove of said frame and communicated with each said groove, said through recess disposed at an inner side of each said groove closes to a center portion of said frame capable of being protruded through by each said engagement portion disposed at an inner end of each said lens, two stop edges are formed outwardly and each of said stop edges is disposed between an inner wall of an inner side of each said groove and each of said nosepieces for being correspondingly engaged into each of said notch disposed at an inner side of each said lens so as to secure each said lens firmly;

whereby a pair of eyeglasses is formed, the lense of said pair of eyeglasses is changeable rapidly and conveniently.

* * * * *